(12) United States Patent
Gaissinsky et al.

(10) Patent No.: US 6,566,626 B2
(45) Date of Patent: May 20, 2003

(54) METHOD AND APPARATUS FOR GENERATING COLOR IMAGES IN A TRANSPARENT MEDIUM

(75) Inventors: Grigory Gaissinsky, Karmiel (IL); Victor Kopelev, Derech HaShalom (IL); Stella Kopelev, Derech HaShalom (IL); Sergey Oshemkov, Petrodvorets (RU); Nikolay Guletsky, Metallistov (RU); Vladimir Dmitriev, St. Petersburg (RU)

(73) Assignee: Laserglass Ltd., Zemach (IL)

( * ) Notice: Subject to any disclaimer, the term of this patent is extended or adjusted under 35 U.S.C. 154(b) by 9 days.

(21) Appl. No.: 09/898,964

(22) Filed: Jul. 3, 2001

(65) Prior Publication Data

US 2003/0015509 A1 Jan. 23, 2003

(51) Int. Cl.[7] ............................................... B23K 26/00
(52) U.S. Cl. ................................................... 219/121.69
(58) Field of Search ........................ 219/121.61, 121.67, 219/121.69, 121.85, 121.6; 65/30.11; 347/224

(56) References Cited

U.S. PATENT DOCUMENTS

| | | | |
|---|---|---|---|
| 4,017,328 A | 4/1977 | Higgins | |
| 4,057,408 A | 11/1977 | Pierson et al. | |
| 4,092,139 A | 5/1978 | Ference | |
| 4,134,747 A | 1/1979 | Pierson et al. | |
| 4,266,012 A | 5/1981 | Stookey | |
| 4,295,872 A | 10/1981 | Luers | |
| 4,302,235 A | 11/1981 | Luers | |
| 4,328,299 A | 5/1982 | Beall et al. | |
| 4,403,031 A | 9/1983 | Borrelli et al. | |
| 4,467,172 A | 8/1984 | Ehrenwald et al. | |
| 5,078,771 A | 1/1992 | Wu | |
| 5,206,496 A | 4/1993 | Clement et al. | |
| 5,322,538 A | 6/1994 | Kondo et al. | |
| 5,656,186 A | 8/1997 | Mourou et al. | |
| 5,761,111 A | 6/1998 | Glezer | |
| 6,313,436 B1 | * 11/2001 | Harrison | |
| 6,399,914 B1 | 6/2002 | Troitski | |
| 6,417,485 B1 | 7/2002 | Troitski | |
| 6,426,480 B1 | 7/2002 | Troitski | |
| 6,444,068 B1 | * 9/2002 | Koops et al. | |

FOREIGN PATENT DOCUMENTS

| | | |
|---|---|---|
| EP | 0 940 718 A2 | 2/1999 |
| RU | 2 008 288 C1 | 2/1994 |

* cited by examiner

*Primary Examiner*—Samuel M. Heinrich
(74) *Attorney, Agent, or Firm*—Shalom Wertsberger; Saltamar Innovations

(57) ABSTRACT

A method and apparatus for generating colored images of at least one color within a light-sensitive glass sample. The glass sample contains light-sensitive chemical components that acquire at least one of a multiplicity of colors in response to actinic radiation and subsequent heating to a temperature that causes color to appear. The method comprises focusing a pulsed laser beam to a target location within the glass, irradiating a plurality of pulses focused in the target location within the glass sample, thus generating a zone of increased opacity to the visible light at the target location and a resultant localized actinic radiation at that zone, displacing the focus point of the laser beam and the glass sample relative to each other by the displacing device in a predetermined manner so as to produce a plurality of zones of increased opacity that form an image, and heating of the sample to a temperature that causes color to appear at the zones of increased opacity.

49 Claims, 3 Drawing Sheets

METHOD AND APPARATUS FOR GENERATING COLOR IMAGES IN A TRANSPARENT MEDIUM

FIELD OF THE INVENTION

The present invention relates to imprinting images in transparent media. More particularly it relates to method and apparatus for imprinting color images in transparent medium, and in particular in transparent light-sensitive glass.

BACKGROUND OF THE INVENTION

Colorless marking of images on or within glass is known. Description of a method and equipment for generating of colorless marks at or underneath glass surface with a laser beam, with energy density generated in its focus point sufficient to form an increased opacity area relative to the visible spectrum part in transparent material, can be found in U.S. Pat. Nos. 4,467,172 and 5,206,496.

In RU Pat. No. 2008288 a description of a technique of generating 3-dimensional patterns in glass, in which the pattern formation while retaining the transparency of the specimen surface is achieved by exceeding the threshold value of the volumetric glass breakdown while simultaneously displacing the specimen with respect to the focused laser beam. However, the patterns generated in the glass using the mentioned methods are colorless and are of low-contrast, which strongly impairs the product consumer's features and appeal.

Color patterns in porous glasses can be generated using the method described in U.S. Pat. No. 4,403,031, in which the liquid that fills the quartz glass pores and contains organic and metal compounds is colored due to photolytic reaction activated by irradiating it with light whose wavelength is in range between 230 to 400 nm.

According to the method described in European Patent application No. 98940718.4, colored three dimensional (3D) images can be generated in transparent porous glasses by focusing laser radiation of wave length of 1060 nm irradiated on the material contained within the pores, which is capable of irreversible color change under the action the optical breakdown factors and subsequent treatment (chemical, thermal, light or acoustical). In porous glasses light-sensitive components do not constitute a part of their chemical composition, but rather they are added to the substance, filling the pores. Moreover, the light transparency coefficient of these glasses is lower in comparison with normal glasses, because the porous glasses are, in reality, a multiphase substance. As a result the field of application of products with colored patterns in porous glasses is limited.

Alternatively the special features of light-sensitive glasses, including polychromatic glasses can be used to obtain color markings. Light-sensitive glasses include light-sensitive components that are a part of their chemical composition. As a result these glasses gain color under the action of actinic (UV, X-, γ-) radiation with subsequent thermal treatment. For example, Stookey (U.S. Pat. No. 4,266,012) suggests a photo-process in which 3–8 colored micro-mosaic filters are designed from different shape polychromatic glass plates or 0.01–1.5 mm films.

In order to make use of the known correlation between light-sensitive glass color and actinic radiation exposure time for generating colored images in such glasses Luers developed a photo-process of generating a black & white negative (U.S. Pat. No. 4,302,235) and semi-transparent net patterns (U.S. Pat. No. 4,295,872).

A color-shaded pattern is obtained by light irradiation on polychromatic glass via a negative or different templates in the wave lengths range of 280 to 320 nm and with total intensity range of 0.4–2.4 Joule/cm$^2$, and subsequent thermal treatment at a temperature between the transformation point (log η=13,4 P) and the glass softening point (logη=7,6 P).

Light-sensitive glasses or their more advances type—polychromatic glasses, which can be colored upon cyclic irradiation of UV radiation and mandatory thermal treatment, contain light-sensitive metals (e.g. Au, Ag) and light-sensitivity sensitizers, such as optical (e.g. $CeO_2$) or thermal ones (e. g. SnO, $Sb_2O_3$). Numerous studies were dedicated to the compositions of light-sensitive glasses (e.g. U.S. Pat. Nos. 4,017,328, 4,057,408, 4,092,139, 4,134,747, and 4,328,299). In spite of a great number of known compositions their elaboration is being continued nowadays and is aimed at optimizing light-sensitive glass features needed to obtain the required color shades customized to a variety of purposes and the techniques of generating colored images.

For example, U.S. Pat. No. 5,078,771 describes compositions of polychromatic glasses, which are being synthesized and placed as a $0.1\mu$ layer at the surface of glass matrix during the course of ions exchange, taking into consideration the chemical composition of specifically adopted bath. Under the action of high-energy laser beam in the wavelength range of 200–300 nm digital or other visual information can be recorded and later developed by thermal treatment and etching in hydrofluoric acid. Such information carriers in a form of products with surface topography can be applied in electronics and computer technologies.

Description of similar technology of etching of parts made from light-sensitive glass in hydrofluoric acid, which were irradiated with UV—laser pulse radiation and underwent subsequent thermal treatment, can be found in U.S. Pat. No. 5,322,538. Products manufactured using this technology were offered for use in high-quality heads of printing devices.

In the coloring methods described in the above references colored information in light-sensitive glass is generated either in a form of marks (patterns) at the surface or penetrating from the surface to the material depth. Namely, these methods cannot be used for generating color patterns localized in light-sensitive glass volume and not related to the product surface.

Furthermore the methods described in the prior art utilize external UV radiation in order to acquire color images within the sample, and as a result there always exist traces of color going from the surface inwardly.

A main object of the present invention is to provide a method and apparatus for generating colored marks (patterns) localized in the volume of light-sensitive glass but not related to the product surface i.e. there is no contact of colored image with the surface of specimen.

BRIEF DESCRIPTION OF THE INVENTION

It is therefore thus provided, in accordance with a preferred embodiment of the present invention, a method for generating colored images of at least one of a plurality of colors within a light-sensitive glass sample that contains light-sensitive chemical components that acquire at least one of a plurality of colors in response to actinic radiation and subsequent heating to a temperature that causes color to appear, the method comprising:

providing pulsed laser beam source having a radiation off the range of ultraviolet spectrum;

providing a focusing device for focusing said pulsed laser beam at a predetermined focus point within the glass;

providing a displacing device for providing relative predetermined displacement between the focus point and the glass sample;

focusing the laser beam to a target location within the glass;

irradiating a plurality of pulses of the pulsed laser beam focused in the target location within the glass sample so as to generate a zone of increased opacity to the visible light at the target location and a resultant localized actinic radiation at that zone;

displacing the focus point of the laser beam and the glass sample relative to each other by the displacing device in a predetermined manner so as to produce a plurality of zones of increased opacity that form an image; and heating of the sample to a temperature that causes color to appear at the zones of increased opacity.

Furthermore, in accordance with another preferred embodiment of the present invention, the method further comprises performing, after a first color was obtained at the zones of increased opacity at least one cycle of the following steps:

irradiating the pulsed radiation by focusing the laser beam within the sample in said zones of increased opacity to the visible light; and performing further heating of the sample to a temperature that causes another color to appear at the zones of increased opacity.

Furthermore, in accordance with another preferred embodiment of the present invention, said further heating comprises heating the glass sample to a temperature between the transformation point and the point of glass softening.

Furthermore, in accordance with another preferred embodiment of the present invention, said repeated pulsed radiation is concurrent with additional irradiation generated from a second pulsed laser beam, or from an ultraviolet lamp.

Furthermore, in accordance with another preferred embodiment of the present invention, said irradiating a plurality of pulses of the pulsed laser or repeating pulsed radiation is performed during the heating of the sample in a temperature range of 150–550° C.

Furthermore, in accordance with another preferred embodiment of the present invention, the laser beam power density at the target location is greater than the threshold value of the sample's glass volume breakdown.

Furthermore, in accordance with another preferred embodiment of the present invention, the pulse duration of the pulsed laser radiation is shorter than $10^{-6}$ seconds.

Furthermore, in accordance with another preferred embodiment of the present invention, the relative displacement of the laser beam focus point and the glass sample is carried out in two dimensions.

Furthermore, in accordance with another preferred embodiment of the present invention, the relative displacement of the laser beam focus point and the glass sample is carried out in three dimensions.

Furthermore, in accordance with another preferred embodiment of the present invention, the irradiation of the pulsed laser beam focused in the target location within the glass sample is concurrent with localized heating of the irradiated zone to temperatures beyond the temperature of glass transformation point.

Furthermore, in accordance with another preferred embodiment of the present invention, the heating is performed in two stages, the first stage performed at a temperature between the transformation point of the glass sample and the glass softening point, and the second stage performed at a temperature which is by 50–120° C. higher than that of the first stage.

Furthermore, in accordance with another preferred embodiment of the present invention, the power density of the radiation of the pulsed laser is different for at least two target locations within the glass sample.

Furthermore, in accordance with another preferred embodiment of the present invention, the light sensitive glass sample contains by mass % up to 0.25 of one or more light sensitive metals selected from Ag and Cu.

Furthermore, in accordance with another preferred embodiment of the present invention, the light sensitive glass sample contains by mass % up to 0.8 of Au and up to 0,015 Pd.

Furthermore, in accordance with another preferred embodiment of the present invention, the light sensitive glass sample contains by mass % a rare-earth element oxides selected from Sm, Tb, Pr, Eu and ceric oxide in amount: 0.01–0.03 of ceric oxide and 0.01–0.02 of others, but not more than 0.2 all together.

Furthermore, in accordance with another preferred embodiment of the present invention, the light-sensitive glass sample contains 0.01–1.2% of $Sb_2O_3$ or 0.01–1.2% of SnO, or both, not exceeding in total 2.3%.

Furthermore, in accordance with another preferred embodiment of the present invention, the light-sensitive glass sample alkaline-silicate glass and is mainly composed of the following components by mass %: 10–22 $R_2O$; 0–18 ZnO, 0–11 $Al_2O_3$; 0–9 (BeO, MgO, CaO); 0–5 $B_2O_3$; 0–12 (BaO, SrO); 0–5CdO; 0–13 (F, Br, Cl, J), $SiO_2$>55.

Furthermore, in accordance with another preferred embodiment of the present invention, the ratio between the mass percentage of alkali oxides and the total mass percentage of halogens is in the range of 1.2–9.1.

Furthermore, in accordance with another preferred embodiment of the present invention, there is provided a method for generating colored images of at least two of a plurality of colors within a light-sensitive glass sample that contains light-sensitive chemical components that acquire at least one of a plurality of colors in response to actinic radiation and subsequent heating to a temperature that causes color to appear, the method comprising:

providing pulsed laser beam source having a radiation off the range of ultraviolet spectrum;

providing a focusing device for focusing said pulsed laser beam at a predetermined focus point within the glass;

providing a displacing device for providing relative predetermined displacement between the focus point and the glass sample;

focusing the laser beam to a target location within the glass;

irradiating a plurality of pulses of the pulsed laser beam focused in the target location within the glass sample so as to generate a zone of increased opacity to the visible light at the target location and a resultant localized actinic radiation at that zone;

displacing the focus point of the laser beam and the glass sample relative to each other by the displacing device in a predetermined manner so as to produce a plurality of zones of increased opacity that form an image;

heating of the sample to a temperature that causes color to appear at the zones of increased opacity; and performing at least one cycle of the following steps:

irradiating the pulsed radiation by focusing the laser beam within the sample in said zones of increased opacity to the visible light;

heating of the sample to a temperature that causes another color to appear at the zones of increased opacity.

Furthermore, in accordance with another preferred embodiment of the present invention, there is provided an apparatus for generating colored images of at least one of a plurality of colors within a light-sensitive glass sample that contains light-sensitive chemical components that acquire at least one of a plurality of colors in response to actinic radiation and subsequent heating to a temperature that causes color to appear, the apparatus comprising:

pulsed laser beam source having a radiation off the range of ultraviolet spectrum;

focusing device for focusing said pulsed laser beam at a predetermined focus point within the glass;

displacing device for providing relative predetermined displacement between the focus point and the glass sample; and controller for controlling and activating the pulsed laser beam source, the displacing device and the timing and synchronization of both.

Furthermore, in accordance with another preferred embodiment of the present invention, the pulsed laser beam source generates pulsed radiation whose duration is shorter than $10^{-6}$ sec.

Furthermore, in accordance with another preferred embodiment of the present invention, the pulsed laser beam source generates power density in the focus point that is higher than the threshold value of the glass volume breakdown.

Furthermore, in accordance with another preferred embodiment of the present invention, the displacing device provides two dimensional relative displacement.

Furthermore, in accordance with another preferred embodiment of the present invention, the displacing device provides three dimensional relative displacement.

Furthermore, in accordance with another preferred embodiment of the present invention, the controller comprises a computer.

Furthermore, in accordance with another preferred embodiment of the present invention, the apparatus is further provided with a heater for heating the light-sensitive glass sample.

Furthermore, in accordance with another preferred embodiment of the present invention, the heater is adapted to heat the light-sensitive glass sample to temperatures in the range 150–550° C.

Furthermore, in accordance with another preferred embodiment of the present invention, the heater comprises a furnace.

Furthermore, in accordance with another preferred embodiment of the present invention, the apparatus is further provided with dispositioning device for dispositioning the glass sample into and out of the furnace.

Furthermore, in accordance with another preferred embodiment of the present invention, the apparatus is further provided with an additional pulsed laser beam source or an ultraviolet lamp.

Furthermore, in accordance with another preferred embodiment of the present invention, said additional pulsed laser beam source is adapted to irradiate actinic radiation.

Furthermore, in accordance with another preferred embodiment of the present invention, the controller sets the laser beam power control device to generate different power densities in at least two different zones of increased opacity.

Finally, in accordance with another preferred embodiment of the present invention, there is provided an apparatus for generating colored images of at least one of a plurality of colors within a light-sensitive glass sample that contains light-sensitive chemical components that acquire at least one of a multiplicity of colors in response to actinic radiation and subsequent heating to a temperature that causes color to appear, the apparatus comprising:

pulsed laser irradiating means having a radiation off the range of ultraviolet spectrum;

focusing means for focusing said pulsed laser beam at a predetermined focus point within the glass;

displacing means for providing relative predetermined displacement between the focus point and the glass sample; and controlling means for controlling and activating the pulsed laser beam source, the displacing device and the timing and synchronization of both.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention as defined in the appending Claims. Like components are denoted by like reference numerals.

DETAILED DESCRIPTION OF THE INVENTION AND FIGURES

Figure 1:
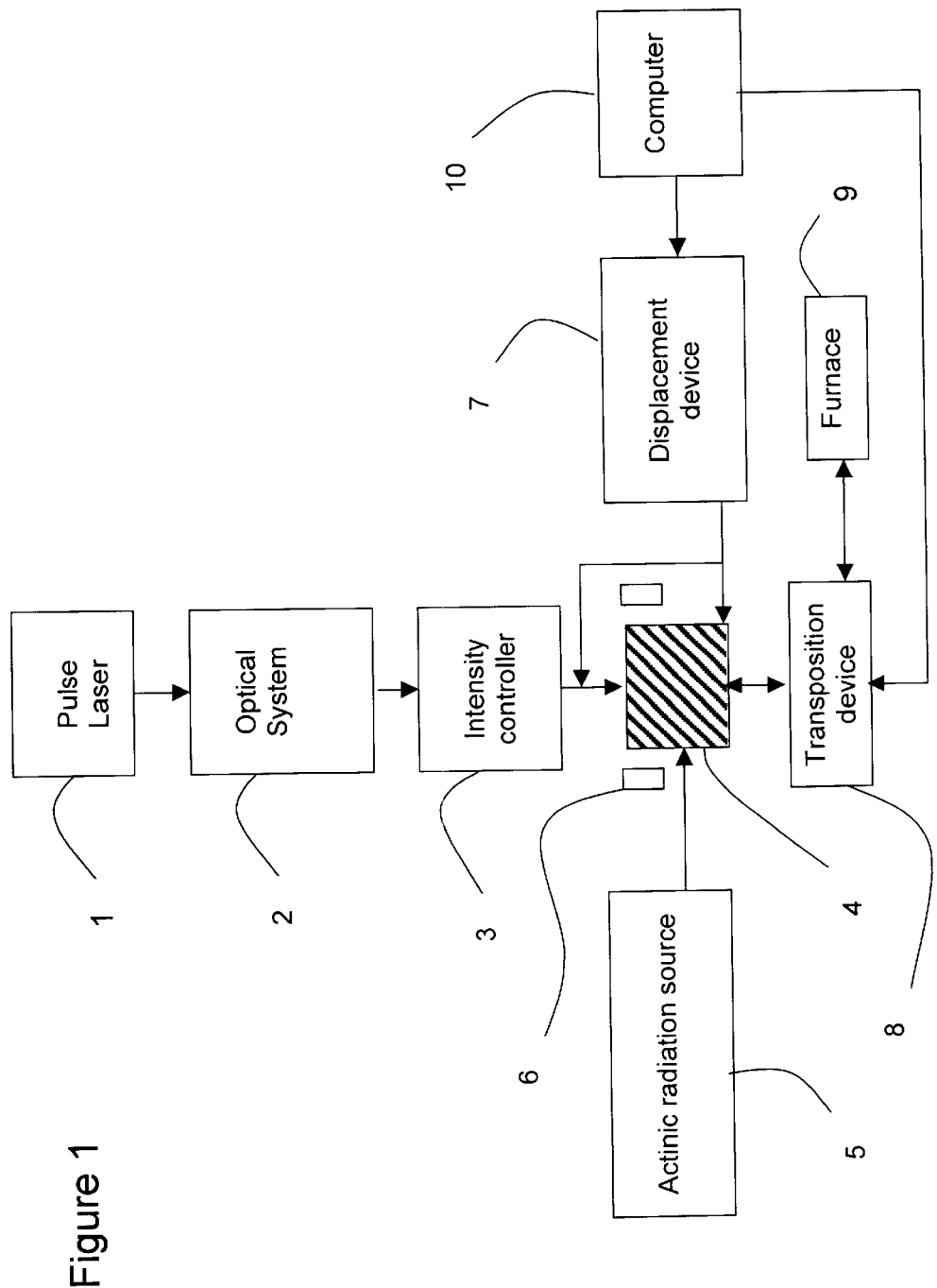
FIG. 1 illustrates an apparatus for producing color images in light-sensitive glass, in accordance with a preferred embodiment of the present invention.

The term "light-sensitive glass" is used in reference to glasses, chemical compositions of which include light-sensitive components painting the glasses in one (monochromatic glass) or several (polychromatic glass) colors by actinic radiation and development.

The term "colored marks" is used in reference to two- or three-dimensional colored images with predetermined shape of no less than one color localized within the glass, under the glass external surface. The mentioned colored marks are disposed in either a colorless or a colored glass product.

Light-sensitive glass has been selected as a material for generation of colored marks within owing to such glass parameters as high light-sensitivity, high optical resolution, which enables to use it in the discussed method. In addition, polychromatic glass makes it possible to obtain a wide range of colors generated within.

Obtaining different colors inside light-sensitive glasses will become apparent from the following description by the example of glass containing Ag used as a light-sensitive additive (see U.S. Pat. No. 4,328,299). Upon irradiation of ultraviolet (UV) light or other actinic radiation on the glass at the presence of optical sensitizer such as $Ce^{3+}$ within the glass, the following photoreaction takes place:

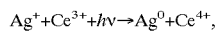

$Ag^+ + Ce^{3+} + h\nu \rightarrow Ag^0 + Ce^{4+}$, in which nuclei of crystallization are generated as silver atoms $Ag^0$. More silver atoms are deposited on them as a result of diffusion occurring during thermal treatment, namely formation and growth of $(Ag^0)_n$ aggregates to the size comparable to visible light wavelength takes place. Such thermal treatment may be performed in one or two stages. In case of heat treatment done in two stages, the first stage is performed at a temperature between the transformation point of the glass sample and the glass softening point, and the second stage is performed at a temperature which is by 50–120° C. higher than that of the first stage. This results in yellow coloring typical for silver-containing glasses. Yellow color in light-sensitive silver-containing glasses shows at relatively low concentrations of Ag—up to 0.25% by mass and $CeO_2$—0.3% by mass.

Upon repeated radiation and thermal treatment of such glasses at the presence of halides of alkali metals such as NaCl, NaF, NaJ, NaBr, the nucleation and growth of silver atomic complex together with halides of alkali metals crystals takes place in the following manner (in case of NaCl):

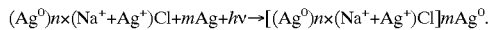

$(Ag^0)n \times (Na^+ + Ag^+)Cl + mAg + h\nu \rightarrow [(Ag^0)n \times (Na^+ + Ag^+)Cl]mAg^0.$ Generation of such complexes results in glass coloring in different colors. Every specific color is related to the concentration of photo-reduced silver in the mentioned complexes and their geometry as a result of repeated irradiation of actinic radiation followed by thermal treatment (that is sometimes referred to as "development"), which basically constitutes heating up the irradiated glass in a furnace or in other suitable manner to acquire coloring.

However, the mentioned method as such fails to generate a colored mark localized in the glass volume, i.e. located under the product surface. The reason is that the linear nature of the actinic radiation interaction with light-sensitive glass results in the generation of colored traces on the beam path from the product surface and into the mark localization area.

The mentioned colored traces can be prevented by using radiation having a threshold value of interaction with light-sensitive glass, in other words non-linear radiation. In the present invention the use of focused pulsed laser radiation of wavelength outside the limits of the UV spectrum region is suggested. Moreover, the power density of such radiation in the beam's focus point is higher than the volumetric breakdown value of the glass, which results in the generation of areas of increased opacity to the visible light at the focus point without causing visible destruction of the sample surface. This is because UV irradiation is known to cause visible traces extending from the surface inwardly towards the image.

Actinic radiation with relatively low intensity of the order of magnitude of 0.01 j/cm² is concurrently generated at the volumetric breakdown point. As a result localized UV radiation is generated. This actinic radiation leads to the mentioned photochemical reaction in the glass areas immediately adjacent to the mentioned areas of increased opacity. These areas become colored after subsequent thermal treatment of the product (development). Optical breakdown at the laser beam focus point, which results in generation of increased opacity areas to the visible light, could, also, combined with heating the sample beyond the temperatures of the glass transformation beginning. The irradiation of focus point and localized heating of the zone of the focus point could be done at the same time. In case of such combination the mentioned areas of increased opacity acquire color that is typical of the light-sensitive elements added to the glass composition directly during radiation. Low intensity of the mentioned actinic radiation generated at the volume breakdown point dictates the need for use of glasses with high light-sensitivity as a material for the products manufacture. Consequently, selecting optimal contents of light-sensitive materials, optical and thermal sensitizers and other glass components provides for high light-sensitivity characteristics.

It is important to note that the method of the present invention avoids the use of external source of UV radiation as this leads to traces from the surface of the sample inwardly. Instead external radiation outside the spectrum of UV is used to produce localized optical breakdown that results in localized actinic radiation that is sufficient to cause localized coloring once thermal treatment is administered.

In order to extend the color shades range, the aforementioned glass, which pertains to alkali-silicate glasses group, contains at least one metal selected from the group of Ag, Cu, Pd or Au as a light sensitive metal, whereas Ag, Cu, contents in the glass is up to 0.25% by mass, Au—up to 0.8% by mass, and Pd—up to 0.015%.

For increased light-sensitivity along with extended spectral range, optical sensitizers from among oxides of elements Sm, Tb, Pr, Eu at a rate of 0.01–0.2% by mass and/or $CeO_2$—0.01–0.3% by mass are added to the glass separately or together, however their total amount should preferably not exceed 0.3% by mass.

The light-sensitive metal ability to produce coloring during thermal treatment is improved by adding thermal sensitizers—polyvalence ions of antimony and/or tin, in the form of $Sb_2O_3$ at a rate of 0.01–0.2% by mass, SnO at a rate of 0.01–0.2%, however their total amount should preferably not exceed 2.3% by mass.

It is known that nuclei centers are generated during actinic radiation and subsequent thermal treatment of polychromatic glasses, on which micro-crystals of fluorides of alkali metals and halides of light-sensitive elements are separated out. For the generation of nuclei centers oxides of alkali metals $R_2O$ are added separately or together to the glass ($Na_2O$, $K_2O$ and $Li_2O$) preferably at a rate of 10–22% by mass as well as halides (F, Br, Cl, J) preferably at a rate of 0.0–0.4% by mass.

The activation energy of the above mentioned kinetic process diminishes with the increase of the number of halide crystals phases, generating the nuclei centers. This is determined by the combined presence of the mentioned halides in the glass. Moreover, the halides ratio in the light-sensitive glass composition should provide the closer similarity between the multi-component composition of micro-crystals and the multi-component eutectics area.

It was found out that this condition is fulfilled when the ratio between the total amount of alkali oxides ($R_2O$) and the halides (F, Cl, BR, J) in glass is within the limits 1.2–9.1.

Implementation of the mentioned method for generation of colored marks inside a glass product made from polychromatic glass is illustrated in the block-diagram of the equipment is given in FIG. 1.

A pulse laser 1 generates laser radiation of predetermined wavelength and pulse power. The laser beam passes via optical system 2 and intensity controller 3 and is focused at a predetermined point of specimen 4, which is made from light-sensitive glass. For obtaining two or three-dimensional color marks within the glass a relative displacement device 7 is provided, which performs relative displacement of the focus point and the product in two or three reciprocally perpendicular directions (i.e. X-Y-Z axes for three dimensional marks and X-Y axes for two dimensional marks). This displacement is preferably controlled by computer 10, so that in case of volumetric breakdown of glass in the focus points with generation of regions of increased opacity a two- or three-dimensional image of predetermined shape is formed.

Following the end of image formation an optional computer-aided transposition device 8 is used to put the product to furnace 9. The product is subjected to thermal treatment in the furnace, which results in its monochromatic coloring. To paint the product in a plurality of colors, it is subjected to repeated radiation and thermal treatment cycles. Each color needs a certain predetermined number of such cycles. To do so product 4 is replaced by transposition device 8 to the initial position on the laser beam path and radiation by beam focused in the image points whose color is to be changed is shined on it.

The required color is obtained by the pulse intensity adjusting with intensity controller 3 and simultaneous product heating with a heater or/and an additional actinic radiation from source 5. This source could be a monochromatic continuous radiation generated from a UV lamp, or pulsed actinic radiation from a laser of a predetermined wavelength). At the end of radiation product 4 is returned to furnace 9 with product transposition device 8 for the entire image or its parts coloring to another required color.

For better understanding of the present invention several examples are discussed herein.

Table 1 includes some examples of light-sensitive glasses, including polychromatic glasses that are suitable for color marking in accordance with the present invention, whose composition is given in % by mass.

The contents of the main glass components is nearly 100%, whereas the contents of sentitizers and light-sensitive elements is given beyond 100%, That is to say, the 100% is the sum of the content of main components, disregarding small additives since the amount of light-sensitive additives is extremely low, their content is given in a metal rather than in oxide form.

TABLE 1

| | Glass No. | | | | | |
|---|---|---|---|---|---|---|
| Components | 1 | 2 | 3 | 4 | 5 | 6 |
| $SiO_2$ | 71.3 | 72.5 | 66.6 | 70.7 | 69.7 | 70.6 |
| $Al_2O_3$ | 1.6 | 3.9 | 10.6 | 5.3 | 4.6 | 5.4 |
| $Na_2O$ | 18.4 | 15.4 | 14.6 | 16.3 | 15.4 | 3.2 |
| $Li_2O_3$ | — | — | — | — | — | 11.7 |
| $B_2O_3$ | — | — | 0.9 | — | — | — |
| ZnO | — | — | — | 4.4 | 6.0 | — |
| CaO | 8.5 | — | — | — | — | — |
| BaO | — | 8.1 | 7.2 | — | — | — |
| F | — | — | — | 2.54 | 2.25 | — |
| Br | — | — | — | 0.18 | 1.75 | 8.0 |
| Cl | — | — | — | 0.51 | — | — |
| J | — | — | — | — | — | 1.0 |
| SnO | 0.26 | — | — | 0.4 | 0.01 | 0.1 |
| Au | — | 0.03 | 0.029 | — | — | — |
| Ag | — | — | — | 0.01 | 0.015 | 0.2 |
| Pd | — | — | 0.001 | — | — | — |
| $Cu_2O$ | 0.14 | — | — | 0.1 | — | 0.15 |
| $CeO_2$ | 0.1 | 0.07 | 0.03 | — | 0.02 | 0.12 |
| $Sb_2O_3$ | — | 0.3 | 0.06 | 0.49 | 0.075 | 0.15 |
| $Sm_2O_3$ | — | — | — | 0.025 | — | — |

Glass specimens were shaped as 30×30×3 mm plates, 40×40×40 mm glass cubes and 50×50×80 mm prisms or else were made from the mentioned glasses. The working surfaces of the specimens, namely the surfaces through which laser beam or radiation from an additional actinic radiation source penetrated to the sample depth were thoroughly polished (Rz<0.05). The specimens were exposed to radiation and thermal treatment for colored marks generating. Embodiments of the present invention are described below with references to the appropriate figures.

EXAMPLE 1

A process of generating a decorative pattern within a light-sensitive glass is described herein.

Figure 2:
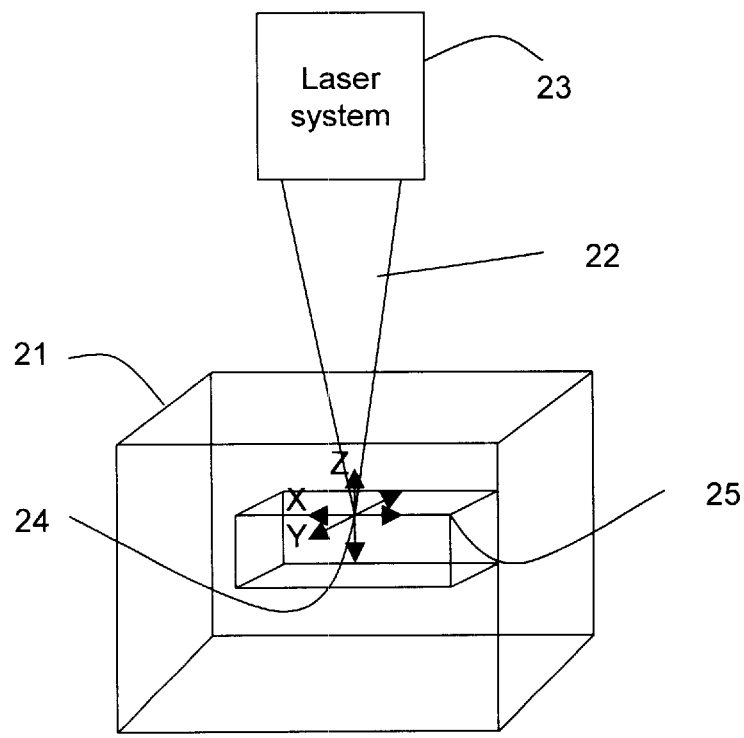
FIG. 2 illustrates a process of generating of decorative pattern in light-sensitive glass, in accordance with a preferred embodiment of the present invention.

A glass brick sample 21 of size 40×40×40 mm made from glass No. 5 (all glass numbers refer to table 1) was positioned at a predetermined position in front of laser beam 22 (FIG. 2). Pulse Nd-YAD (neodymium-yttrium-aluminum garnet) laser was used as a laser radiation source. Laser 23, which generates pulse radiation had the following parameters: wavelength 1060 nm, pulse duration $2 \times 10^{-8}$ sec, pulse energy up to 10 mJ. The laser beam was focused in a predetermined area under the sample surface. As a result of optical breakdown, areas of increased opacity relative to the visible light were generated in the sample volume. The sample and the beam focus point 24 were displaces relatively to each other in 3D-coordinates according to a predetermined program, forming a certain colorless decorative pattern 25 in the product volume. Up to 10 radiation pulses were used to generate each pattern point. After the pattern formation the sample was placed into a furnace for heating for 30 min at a temperature of 400° C. and for some 30 minutes at a temperature of about 520° C. After cooling a yellow decorative pattern could be observed in the sample.

EXAMPLE 2

A process of inscribing a measurement scale within a light-sensitive glass is described herein.

Sample plate 31 (FIGS. 3*a, b, c,*) of a dimensions 30×30×3 mm made from glass No. 6 was exposed to laser 32 radiation and heating according to the conditions described with reference to example 1.

Figures 3A, 3B, 3C:
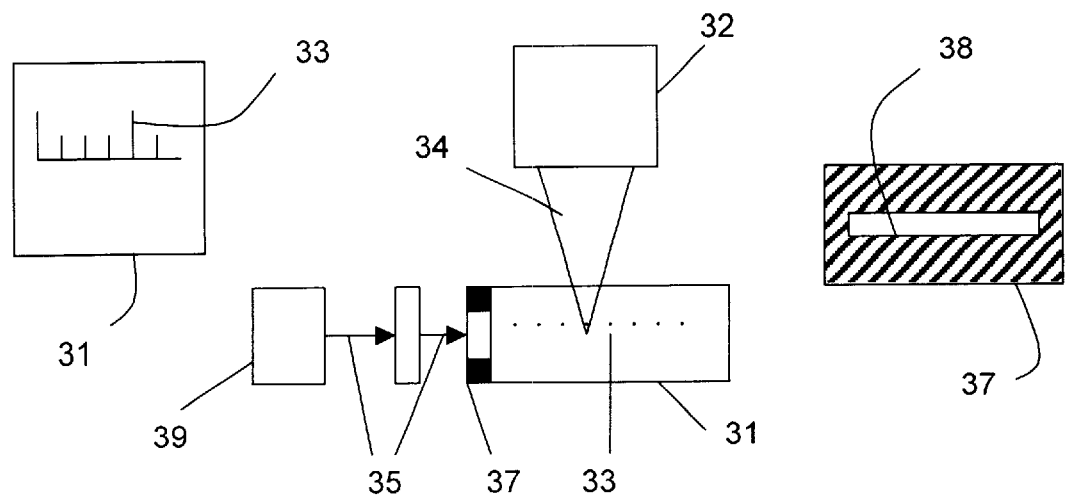
FIGS. 3a, 3b and 3c illustrate the process of generating of measurement scale in specimen.

A pulse Nd-YAD laser was used as a laser radiation source, which generated radiation with the following parameters: wavelength 530 nm, pulse duration $5 \times 10^{-12}$ sec, pulse energy up to 10 mJoule. Measurement scale pattern 33 yellow in color was generated in plate 31 volume. Afterwards, plate 31 was returned to its original position on the way of laser beam 34. Focused laser beam was sent to the points that had formed the pattern at the first stage. Up to 50 pulses were used to generate each pattern point. At the same time the plate was exposed to radiation from the side by collimated UV beam 35 with wavelength 345 nm through filter 36 and template 37 with a 0.25 mm wide slot 38 (FIGS. 3*b, c*). UV 500 W Hg lamp 39 with a 345 nm band separated from its spectrum by filter 36 was used as a UV radiation source. The UV exposition was up to 16 Joule/cm². After radiation the plate was heated for some 30 minutes at a temperature of about 400° C. A measurement scale green in color was obtained.

EXAMPLE 3

A decorative pattern (image) generating process within a light-sensitive glass is described herein.

A prism of a size 50×40×80 mm made from glass No. 5 was exposed to laser radiation and underwent heating according to the conditions described in example 1. As a radiation source Nd-YAD laser was used, which generated radiation with the following parameters: wavelength 530 nm, pulse duration $5 \times 10^{-12}$ sec, pulse energy up to 10 mJoule. A pattern yellow in color was generated in the prism volume. The prism was returned to its initial position in front of the laser beam and was exposed to repeated radiation with focused laser beam at the points that formed the pattern at the first stage. Up to 150 pulses were applied to generate each point, while at the same time the prism was heated to the temperature of about 500° C. After radiation the prism was heated for some 30 minutes to a temperature of about 400° C. A decorative pattern orange in color was obtained.

EXAMPLE 4

A process of generating a trademark within a light-sensitive glass is described herein.

Figure 4A:
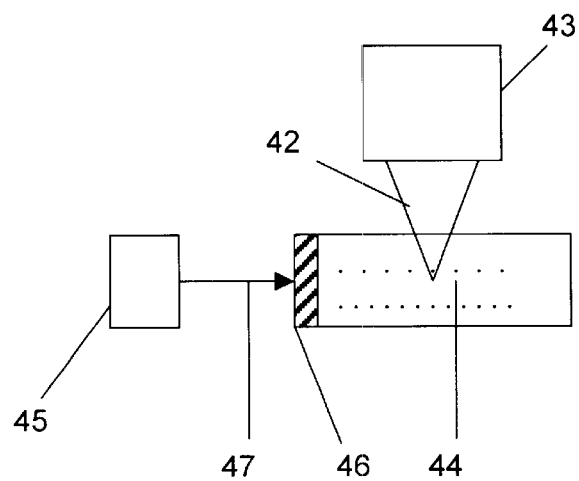
FIGS. 4a and 4b illustrate the process of generating of trademark in a specimen from light-sensitive glass.
Figure 4B:
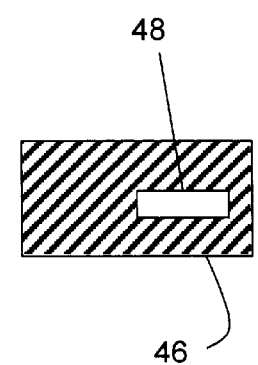

Plate 41 (FIGS. 4*a, b*) of a size 30×30×3 mm made from glass No. 5 was positioned at a predetermined place on the way of a laser beam 42. A laser radiation source Nd-YAD laser 43 was used, which generated radiation having the following parameters: wavelength 530 nm, pulse duration $5 \times 10^{-12}$ sec, pulse energy up to 5 mJoule. A laser beam was focused in a predetermined area under the plate surface, at the same time the plate was heated to a temperature of about 510° C. and 56 pulses were sent to each pattern point. Owing to the relative plate and focus point displacement mark 44 was formed. The plate was heated in the furnace for some 30 minutes at a temperature of about 400° C. and for 30 minutes at a temperature of about 500° C. After cooling a yellow mark 44 was observed in the plate. Plate 41 was returned to its original position on the way of laser beam 42 and is its front side was exposed to radiation generated by focused laser beam 42 from Nd-YAG laser 43 in the points that had formed the pattern at the first stage. Up to 50 pulses were used to generate each point. At the same time the plate was exposed to radiation from the side by an additional radiation source 45 through template 46. Pulse eximer KrF laser that generates collimated laser beam 47 with the length of wave 351 nm, pulse energy of up to 50 mJoule and pulse duration $5.10^{-9}$ sec was used as an additional radiation source. The exposition from the additional radiation source was up to 50 J/cm$^2$. Template 46 (FIG. 4*b*) was formed with a slot 48 of 0.5 mm of width, which left uncovered only half of the pattern to be formed. After radiation the plate was heated for 30 minutes to about 400° C. The obtained trademark was yellow and green in color, moreover, the pattern part exposed to radiation through slot 47 of template 46 was green, whereas the remaining part was yellow.

EXAMPLE 5

A process of identification mark generation within a light-sensitive glass is described herein.

Figure 5A:
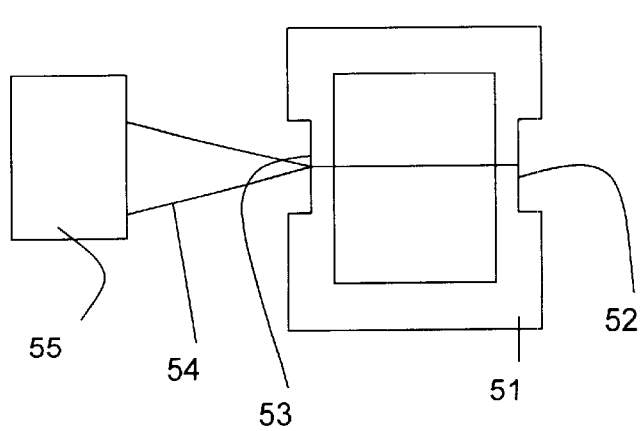
FIGS. 5a and 5b illustrate the process of generating of identification mark in specimen.
Figure 5B:
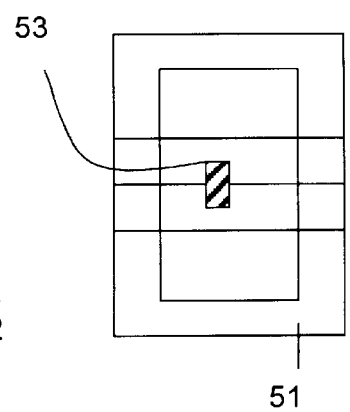

As an example generating of identification mark in a glass case can be considered, which is used as a package for products whose genuine manufacturer must be verified. As such, a glass case with a volumetric colored mark is used as one of the means for product protection from imitation, serving as anti-imitation means. Glass case 51 made from glass No. 2 (FIGS. 5*a* and 5*b*) consisted of two parts (FIGS. 5*a* and 5*b*), which are sealed to each other, for example with glue, after the product is inserted into the case. Case 51 has a so-called "lock" 52, i.e. wall thinned in the two parts joint area. As it is opened, the case is slightly cut along the lock. Identification mark 53, namely the manufacturer's trademark (or other), is applied within the case wall in the lock area so that identification mark 53 is destroyed together with the lock at the event of opening of the case.

The two joined halves of the case were placed on the way of laser beam 54, so that the focus point was located underneath the case surface at the predetermined area of lock 52. A laser radiation source Nd-YAG laser was used, which generated pulse radiation having the following parameters: wave length 530 nm, pulse duration $5.10^{-12}$ sec, pulse energy up to 10 mJoule. Up to 10 pulses were applied to each pattern point. The case and the laser beam focus point were relatively displaced according to the predetermined program forming a colorless pattern of identification mark close to the lock inside the case wall. After the pattern was formed the sample was placed to the furnace and was heated for 30 minutes at a temperature of about 550° C. The color of the generated identification mark turned out violet

EXAMPLE 6

A process of decorative pattern generation within a light-sensitive glass is described herein.

A glass brick sample of a size 40×40×40 mm made from glass No. 4 was set to a predetermined location on the way of the laser beam. As a radiation source a crystal laser was used, which generated radiation with the following parameters: wavelength 1060 nm, pulse duration $5 \times 10^{-15}$ sec, pulse energy up to 1 mjoule. The laser beam was focused in a predetermined area under the sample surface. The sample and the beam focus point were relatively displaced in accordance with a predetermined program designed to create the desired pattern. Six radiation pulses were sent to each pattern point. Moreover, generation of increased opacity areas relatively to the visible light in the laser beam focus points was concurrent with their heating to a temperature higher than the glass transformation point. As a result, a decorative pattern yellow in color was formed in the sample.

It is noted that in order to obtain certain colors (for example orange) it is recommended to perform the step of irradiating of the glass sample when the sample is kept at a temperature in the range of 150 to 550 degrees celcius.

It should be noted that there are some major differences between the method of creating colored image in light sensitive glass in accordance with the present invention, and the method of creating colored images in porous glass.

Light sensitive glass is sensitive to light (in particular to the UV light) owing to light sensitive additives (for example the ions of gold, silver, etc), which are a part of the chemical composition and structure of the glass. Porous glass has no light sensitivity.

Light sensitive glass is a substance that consists of only one homogeneous hard phase. Light sensitive materials are added to the glass batch (raw material) and during the stage of melting of the glass light sensitive ions are evenly distributed in the glass structure.

In order to produce colored internal image glass blocks are made from light sensitive glass using traditional glass technology. This means that the glass blocks could be produced in very large scales, and the dimensions of the colored image could be very big.

Porous glass is a substance that consists of two main phases: a hard phase and a gaseous phase, which is inside the pores, and (as was mentioned before) is initially not light sensitive. It becomes light sensitive after filling of the pores with special light sensitive materials, which constitute in fact a third phase. Thus porous glass is a three-phase substance and its homogeneity is low.

Furthermore, it is known that existing technology may provide porous glasses that are very limited in their thickness (a few millimeter), and the filling of the pores with light sensitive materials is also very limited in depth due to capillary effect. This is why the sizes of product and color image associated with porous glass are very limited in their dimensions.

The technology of preparing semi-finished products from porous glass for producing colored image includes three main steps: preparing the sheet of glass, making the pores, filling the pores with light sensitive material, and this is too expensive a method.

In porous glass the use of thermal post-treatment (development) is not needed in all cases. In some cases it is not employed at all for creating the colored image, in some cases it could be used for strengthening or intensifying of the color.

In light-sensitive glasses thermal post-treatment is needed in all cases for creating the color.

Furthermore, in porous glasses thermal treatment affects locally as only in the optical breakdown area the material changes its properties under the influence of the optical breakdown.

In light sensitive glasses at the instance of optical breakdown centers of coloration are created, and then the diffusion of light sensitive ions occurs changing the glass structure, and not merely locally affecting the area of optical breakdown. It means that thermal post-treatment has a global effect rather than a local one.

In light-sensitive glass several instances of irradiation (or YAG with optical breakdown or UV) may be employed followed by a subsequent thermal treatment. If initially a first laser treatment is applied followed by a post-thermal treatment, and after that an additional laser treatment is applied followed by a thermal treatment, some additional coloring may be achieved.

In porous glasses the first laser treatment changes the condition of material filling the pores in a finite manner, thus creating the final color. No subsequent laser treatment can inflict a change in that color.

It should be noted that all sizes, quantities and other measurements are given for explanatory and demonstrative purposes, and unless specifically stated in this specification, do not limit the scope of the invention as defined in the appended Claims.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

What is claimed is:

1. A method for generating colored images of at least one color within a light-sensitive glass sample that contains light-sensitive chemical components that acquire at least one of a multiplicity of colors in response to actinic radiation and subsequent heating to a temperature that causes color to appear, the method comprising:
   providing pulsed laser beam source having a radiation off the range of ultraviolet spectrum;
   providing a focusing device for focusing said pulsed laser beam at a predetermined focus point within the glass;
   providing a displacing device for providing relative predetermined displacement between the focus point and the glass sample;
   focusing the laser beam to a target location within the glass;
   irradiating a plurality of pulses of the pulsed laser beam focused in the target location within the glass sample so as to generate a zone of increased opacity to the visible light at the target location and a resultant localized actinic radiation at that zone;
   displacing the focus point of the laser beam and the glass sample relative to each other by the displacing device in a predetermined manner so as to produce a plurality of zones of increased opacity that form an image; and
   heating of the sample to a temperature that causes color to appear at the zones of increased opacity.

2. The method of claim 1, further comprising performing, after a first color was obtained at the zones of increased opacity at least one cycle of the following steps:
   irradiating the pulsed radiation by focusing the laser beam within the sample in said zones of increased opacity to the visible light; and
   performing further heating of the sample to a temperature that causes another color to appear at the zones of increased opacity.

3. The method of claim 2, wherein said further heating comprises heating the glass sample to a temperature between the transformation point and the point of glass softening.

4. The method of claim 1, wherein said repeated pulsed radiation is concurrent with additional irradiation generated from a second pulsed laser beam, or from a monochromatic ultraviolet lamp.

5. The method of claim 1, wherein said irradiating a plurality of pulses of the pulsed laser or repeating pulsed radiation is performed during the heating of the sample in a temperature range of 150–550° C.

6. The method of claim 1, wherein the laser beam power density at the target location is greater than the threshold value of the sample's glass volume breakdown.

7. The method of claim 1, wherein the pulse duration of the pulsed laser radiation is shorter than $10^{-6}$ seconds.

8. The method of claim 1, wherein the relative displacement of the laser beam focus point and the glass sample is carried out in two dimensions.

9. The method of claim 1, wherein the relative displacement of the laser beam focus point and the glass sample is carried out in three dimensions.

10. The method of claim 1, wherein the irradiation of the pulsed laser beam focused in the target location within the glass sample is concurrent with localized heating of the irradiated zone to temperatures beyond the temperature of glass transformation point.

11. The method of claim 1, wherein the heating is performed in two stages, the first stage performed at a temperature between the transformation point of the glass sample and the glass softening point, and the second stage performed at a temperature which is by 50–120° C. higher than that of the first stage.

12. The method of claim 1, wherein the power density of the radiation of the pulsed laser is different for at least two target locations within the glass sample.

13. The method of claim 1, wherein the light sensitive glass sample contains by mass % up to 0.25 of one or more light sensitive metals selected from Ag and Cu.

14. The method of claim 13, wherein the light sensitive glass sample contains by mass % up to 0.8 of Au and up to 0.015 Pd.

15. The method of claim 1, wherein the light sensitive glass sample contains by mass % a rare-earth element oxides selected from Sm, Tb, Pr, Eu and ceric oxide in amount: 0.01–0.03 of ceric oxide and 0.01–0.02 of others, but not more than 0.2 all together.

16. The method of claim 1, wherein the light-sensitive glass sample contains 0.01–1.2% of $Sb_2O_3$ or 0.01–1.2% of SnO, or both, not exceeding in total 2.3%.

17. The method of claim 1, wherein the light-sensitive glass sample alkalinesilicate glass and is mainly composed of the following components by mass %: 10–22 $R_2O$; 0–18 ZnO, 0–11 $Al_2O_3$; 0–9 (BeO, MgO, CaO); 0–5 $B_2O_3$; 0–12 (BaO, SrO); 0–5CdO; 0–13 (F, Br, Cl, J), $SiO_2$>55.

18. The method of claim 17, wherein the ratio between the mass percentage of alkali oxides and the total mass percentage of halogens is in the range of 1.2–9.1.

19. A method for generating colored images of at least two colors within a light-sensitive glass sample that contains light-sensitive chemical components that acquire at least one of a multiplicity of colors in response to actinic radiation and subsequent heating to a temperature that causes color to appear, the method comprising:
   providing pulsed laser beam source having a radiation off the range of ultraviolet spectrum;
   providing a focusing device for focusing said pulsed laser beam at a predetermined focus point within the glass;

providing a displacing device for providing relative predetermined displacement between the focus point and the glass sample;

focusing the laser beam to a target location within the glass;

irradiating a plurality of pulses of the pulsed laser beam focused in the target location within the glass sample so as to generate a zone of increased opacity to the visible light at the target location and a resultant localized actinic radiation at that zone;

displacing the focus point of the laser beam and the glass sample relative to each other by the displacing device in a predetermined manner so as to produce a plurality of zones of increased opacity that form an image;

heating of the sample to a temperature that causes color to appear at the zones of increased opacity; and performing at least one cycle of the following steps:
irradiating the pulsed radiation by focusing the laser beam within the sample in said zones of increased opacity to the visible light;
heating of the sample to a temperature that causes another color to appear at the zones of increased opacity.

20. The method of claim 19, wherein said further heating comprises heating the glass sample to a temperature between the transformation point and the point of glass softening.

21. The method of claim 19, wherein said repeated pulsed radiation is concurrent with additional irradiation generated from a second pulsed laser beam, or from a monochromatic ultraviolet lamp.

22. The method of claim 19, wherein said irradiating a plurality of pulses of the pulsed laser or repeating pulsed radiation is performed during the heating of the sample in a temperature range of 150–550° C.

23. The method of claim 19, wherein the laser beam power density at the target location is greater than the threshold value of the sample's glass volume breakdown.

24. The method of claim 19, wherein the pulse duration of the pulsed laser radiation is shorter than $10^{-6}$ seconds.

25. The method of claim 19, wherein the relative displacement of the laser beam focus point and the glass sample is carried out in two dimensions.

26. The method of claim 19, wherein the relative displacement of the laser beam focus point and the glass sample is carried out in three dimensions.

27. The method of claim 19, wherein the irradiation of the pulsed laser beam focused in the target location within the glass sample is concurrent with localized heating of the irradiated zone to temperatures beyond the temperature of glass transformation point.

28. The method of claim 19, wherein the heating is performed in two stages, the first stage performed at a temperature between the transformation point of the glass sample and the glass softening point, and the second stage performed at a temperature which is by 50–120° C. higher than that of the first stage.

29. The method of claim 19, wherein the power density of the radiation of the pulsed laser is different for at least two target locations within the glass sample.

30. The method of claim 19, wherein the light sensitive glass sample contains by mass % up to 0.25 of one or more light sensitive metals selected from Ag and Cu.

31. The method of claim 30, wherein the light sensitive glass sample contains by mass % up to 0.8 of Au and up to 0.015 Pd.

32. The method of claim 19, wherein the light sensitive glass sample contains by mass % a rare-earth element oxides selected from Sm, Tb, Pr, Eu and ceric oxide in amount: 0.01–0.03 of ceric oxide and 0.01–0.02 of others, but not more than 0.2 all together.

33. The method of claim 19, wherein the light-sensitive glass sample contains 0.01–1.2% of $Sb_2O_3$ or 0.01–1.2% of SnO, or both, not exceeding in total 2.3%.

34. The method of claim 19, wherein the light-sensitive glass sample alkaline-silicate glass and is mainly composed of the following components by mass %: 10–22 $R_2O$; 0–18 ZnO, 0–11 $Al_2O_3$; 0–9 (BeO, MgO, CaO); 0–5 $B_2O_3$; 0–12 (BaO, SrO); 0–5 CdO; 0–13 (F, Br, Cl, J), $SiO_2$>55.

35. The method of claim 34, wherein the ratio between the mass percentage of alkali oxides and the total mass percentage of halogens is in the range of 1.2–9.1.

36. An apparatus for generating colored images of at least one of a plurality of colors within a light-sensitive glass sample that contains light-sensitive chemical components that acquire at least one of a plurality of colors in response to actinic radiation and subsequent heating to a temperature that causes color to appear, the apparatus comprising:
pulsed laser beam source having a radiation off the range of ultraviolet spectrum;
focusing device for focusing said pulsed laser beam at a predetermined focus point within the glass;
displacing device for providing relative predetermined displacement between the focus point and the glass sample; and
controller for controlling and activating the pulsed laser beam source, the displacing device and the timing and synchronization of both.

37. The apparatus of claim 36, wherein the pulsed laser beam source generates pulsed radiation whose duration is shorter than $10^{-6}$ sec.

38. The apparatus of claim 36, wherein the pulsed laser beam source generates power density in the focus point that is higher than the threshold value of the glass volume breakdown.

39. The apparatus of claim 36, wherein the displacing device provides two dimensional relative displacement.

40. The apparatus of claim 36, wherein the displacing device provides three dimensional relative displacement.

41. The apparatus of claim 36 wherein the controller comprises a computer.

42. The apparatus of claim 36, wherein the apparatus is further provided with a heater for heating the light-sensitive glass sample.

43. The apparatus of claim 42, wherein the heater is adapted to heat the light-sensitive glass sample to temperatures in the range 150–550° C.

44. The apparatus of claim 42 wherein the heater comprises a furnace.

45. The apparatus of claim 44, wherein the apparatus is further provided with dispositioning device for dispositioning the glass sample into and out of the furnace.

46. The apparatus of claim 36, further provided with an additional pulsed laser beam source or a monochromatic UV lamp.

47. The apparatus of claim 46, wherein said additional pulsed laser beam source is adapted to irradiate actinic radiation.

48. The apparatus of claim 36, wherein the controller sets the laser beam power control device to generate different power densities in at least two different zones of increased opacity.

49. An apparatus for generating colored images of at least one of a plurality of colors within a light-sensitive glass sample that contains light-sensitive chemical components that acquire at least one of a plurality of colors in response to actinic radiation and subsequent heating to a temperature that causes color to appear, the apparatus comprising:

pulsed laser irradiating means having a radiation off the range of ultraviolet spectrum;

focusing means for focusing said pulsed laser beam at a predetermined focus point within the glass;

displacing means for providing relative predetermined displacement between the focus point and the glass sample; and controlling means for controlling and activating the pulsed laser beam source, the displacing device and the timing and synchronization of both.

* * * * *